US005443241A

United States Patent [19]

Odaira et al.

[11] Patent Number: 5,443,241

[45] Date of Patent: Aug. 22, 1995

[54] ELECTRO-MAGNETIC DRIVE CONTROL VALVE

[75] Inventors: Michiya Odaira, Nagoya; Kazunori Sugihara, Kariya; Noriyoshi Miyajima, Nukata; Takumi Miyaki; Motohiko Hiramatsu, both of Obu, all of Japan

[73] Assignees: Nippondenso Co. Ltd., Kariya; Tokai Riki Mfg. Co., Obu, both of Japan

[21] Appl. No.: 304,814

[22] Filed: Sep. 13, 1994

[63] Continuation of Ser. No. 31,394, Mar. 9, 1993, abandoned.

[30] Foreign Application Priority Data

Mar. 9, 1992 [JP] Japan .................................. 4-086242

[51] Int. Cl.[6] .............................................. F16K 31/06

[52] U.S. Cl. ............................ 251/129.07; 137/625.5; 251/129.17

[58] Field of Search ...................... 251/129.07, 129.17; 137/625.5

[56] References Cited

U.S. PATENT DOCUMENTS 3,472,483 10/1969 Janczur .......................... 251/129.07
4,462,541 7/1984 Hansen .
4,606,502 8/1986 Naschberger .............. 251/129.07 X
4,624,285 11/1986 Perach ....................... 251/129.17 X
4,821,774 4/1989 Chorkey .
5,184,773 2/1993 Everingham ................ 137/625.5 X

FOREIGN PATENT DOCUMENTS 61244616 10/1980 Japan .

*Primary Examiner*—Stephen M. Hepperle
*Attorney, Agent, or Firm*—Cushman, Darby & Cushman

[57] ABSTRACT

An electro-magnetic drive control valve having a housing defining valve seats 54 and 66, and valve members 68 and 70 arranged so as to face the valve seat 64 and 66, respectively. The valve members 68 and 70 are formed on a valve rod 67, which is mechanically connected to a solenoid actuator 46. First and second diaphragm members 88 and 96 are provided for connecting the valve rod 67 to the housing and for sealing a flow passageway in the housing, while the valve rod 67 is axially moved by the solenoid actuator 46. The first diaphragm 88 is for sealing the flow passageway to the space 104 inside the solenoid actuator 46. The second diaphragm 96 forms a second chamber 107 on one side thereof remote from the flow passageway. An axial opening 67-2 is formed in the valve rod 67 for creating a communication passageway for connecting the chambers 104 and 106 with each other for equalizing the pressure therein. The pressure equalization allows the solenoid 46 to move in response to a small force generated in the solenoid actuator 46.

7 Claims, 4 Drawing Sheets

Fig. 3
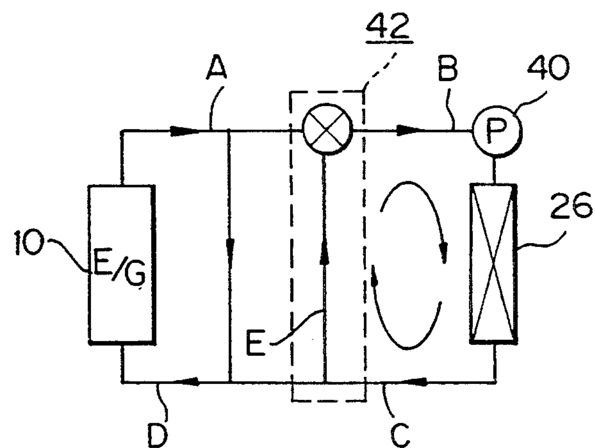
Fig. 4-(a)
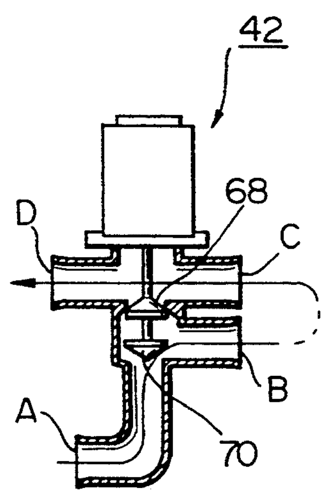
Fig. 4-(b)
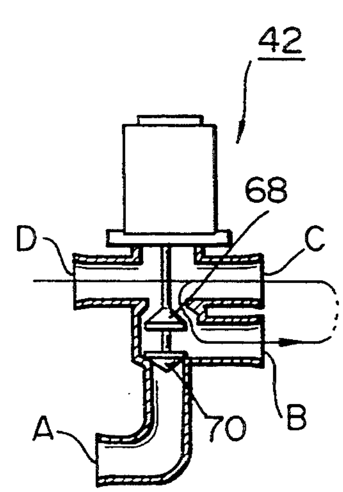

ELECTRO-MAGNETIC DRIVE CONTROL VALVE

BACKGROUND OF THE INVENTION

This application is a continuation of U.S. application Ser. No. 08/31,394, filed Mar. 9, 1993, abandoned.

1. Field of the Invention

The present invention relates to an electromagnetic drive type flow control valve, suitably used in an air conditioning apparatus for an automobile, using hot water for a heating operation.

2. Description of Related Art

A co-pending U.S. patent application No. 856,985 filed on Mar. 24, 1992 proposes an air conditioning (heating) apparatus for an automobile provided with an internal combustion engine, wherein a heater core is arranged in an air duct, and the heater duct is connected to an engine cooling water line for receiving hot water that is subjected to a heat exchange with the air flow in the duct for heating the air discharged to the cabin. An electromagnetic drive control valve is arranged in the passageway of the hot water from the engine for controlling the flow of water and the temperature of the air as discharged. The control valve is constructed by a body defining valve seats, valve members for cooperating with the valve seats, and a solenoid connected to the valve members for controlling the flow of water between the engine cooling water line and the heater core.

As is well known, engine cooling water includes foreign substances, such as a sand, dust and sludge. Therefore, a seal member is provided between a valve shaft and the body for preventing foreign substances in the engine cooling water in the valve body from being introduced into the space inside the solenoid. The space inside the solenoid is, however, in communication with a water flow passageway via a vent opening formed in the valve rod therethrough. The vent passageway is for equalizing the pressure between the space inside the solenoid and the flow passageway. The equalization of the pressure can ensure movement of the valve by a relatively small electromagnetic force generated by the actuator. Thus, a certain amount of foreign substance in the flow passageway can be introduced into the space in the solenoid via the vent passageway in the valve rod, causing the sliding parts, such as the core of the solenoid, to stick.

According to the present invention, an electromagnetic valve device is provided for controlling the flow of a fluid, comprising:

- a housing defining therein a passageway for the fluid;
- a valve rod having at least one valve member movably arranged in the housing for controlling the flow of the fluid in said passageway;
- a solenoid mechanism that includes a moving part connected to the valve rod for obtaining a repeated movement of said valve member for a desired stroke, and a stational part for generating an electromagnetic force for moving said moving part;
- the solenoid mechanism having a chamber, the volume of which varies in accordance with the movement of said moving part;
- a seal member made of a flexible material arranged between the valve rod and the housing so that said first chamber is sealed with respect to the passageway;
- means for defining a second chamber, the volume of which chamber is increased upon a stroke movement of the valve rod for decreasing the volume of the first chamber and is decreased upon a stroke movement of the valve rod for increasing the volume of the first chamber, and;
- means for obtaining the communication of a fluid between the first and second chambers for equalizing the pressure of the communication fluid between the first and second chambers.

BRIEF DESCRIPTION OF ATTACHED DRAWINGS

FIG. 3 is a schematic view illustrating the flow of the engine cooling water in the apparatus in FIG. 2.

FIGS. 4(*a*) and (*b*) are schematic views illustrating patterns of the flows of water in the control valve at OFF and ON positions, respectively.

Figure 2:
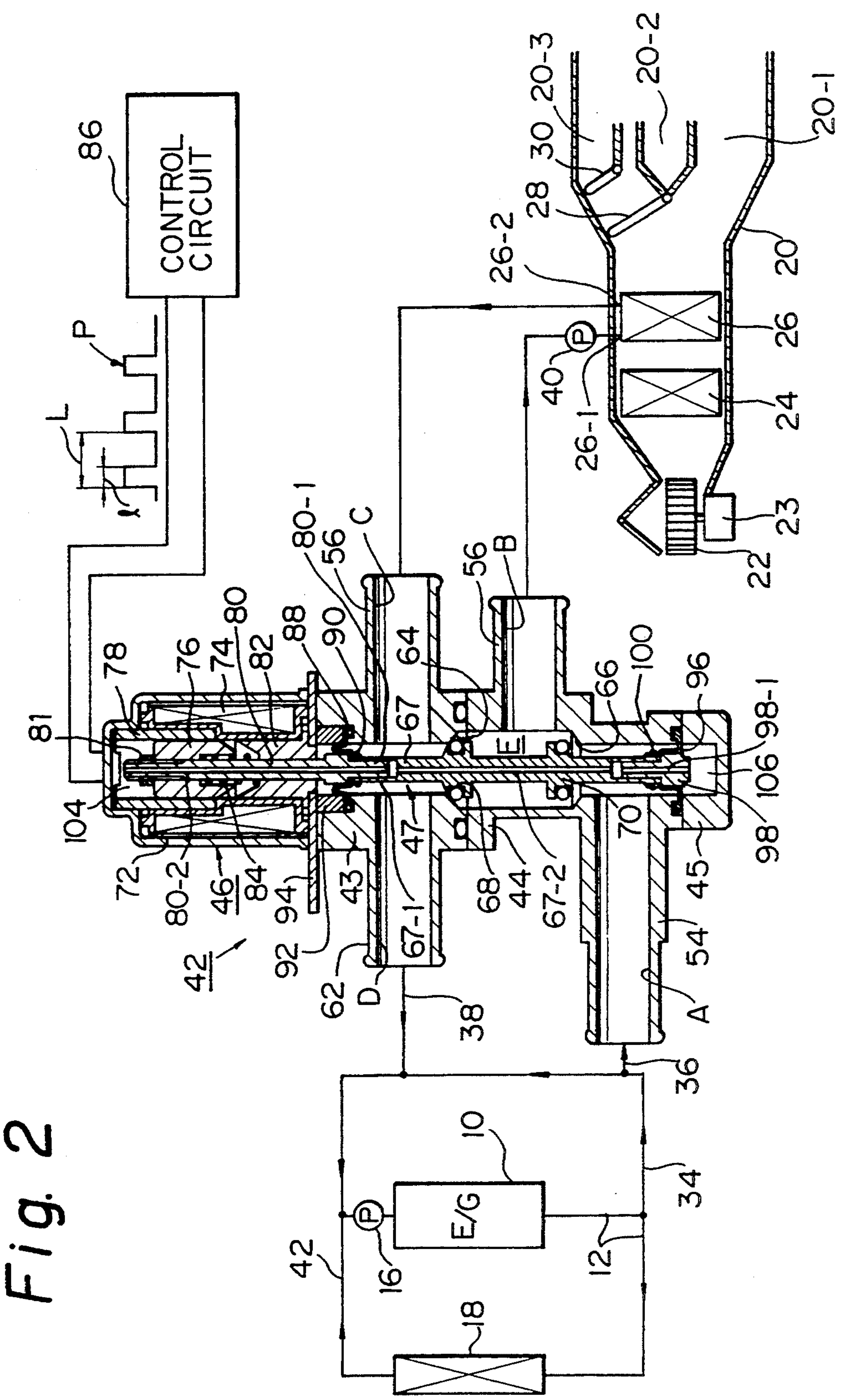
FIG. 2 is a cross sectional view of an electromagnetic drive control valve according to the present invention together with an engine cooling water system and an air conditioning system.
Figure 5:
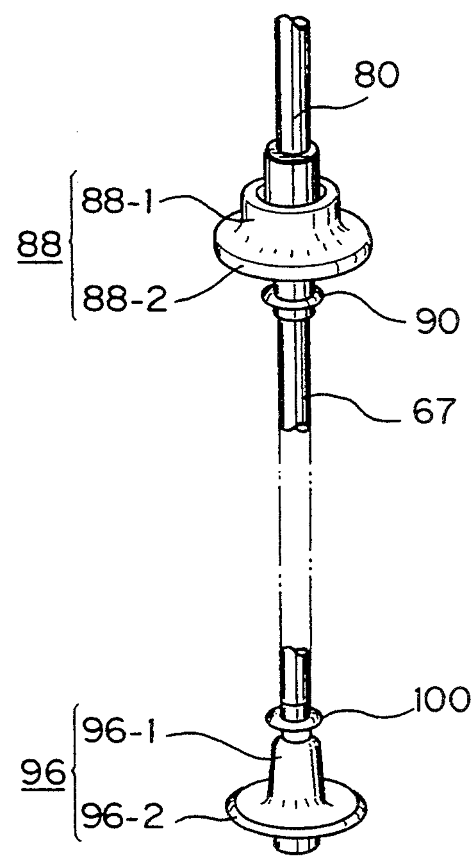

FIG. 5 is a perspective view of a valve assembly in the control valve in FIG. 2.

DESCRIPTION OF A PREFERRED EMBODIMENT

Figure 1:
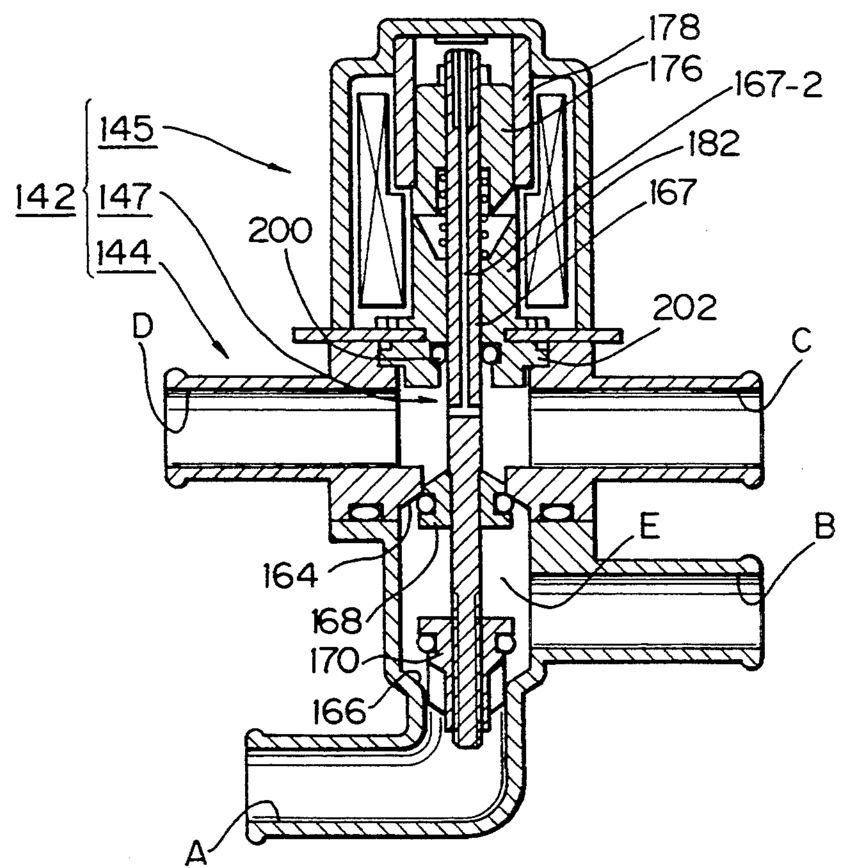
FIG. 1 is a cross sectional view of an electromagnetic drive control valve in a related non-prior art.

FIG. 1 shows a construction of an electromagnetic valve in the related non-prior art, and illustrates a problem to be solved by the present invention. The electromagnetic valve 42 is contructed by a body 144, a solenoid 145 and a valve assembly 147. The body 144 is provided with four ports A, B, C and D, and a chamber E. The valve assembly 147 includes a first vale member 168 cooperating with the first valve seat 164 for controlling the communication of a chamber E with the ports C and D, which are always in communication, and a second valve member 170 cooperating with the second valve seat 166 for controlling the communication of the port A with the port B via the chamber E. These valve members 168 and 170 are provided with seal rings. The electromagnetic valve 142 is for controlling the communication of an engine cooling water between an engine cooling line (not shown in FIG. 1) and a heater core (not shown) in an air conditioning apparatus for an automobile. As is well known, the engine cooling water includes impurities, such as sand, dust, sludge state iron phosphate originating from a chemical reaction of an antifreeze agent at the inner wall of the engine water passageway. In order to prevent these foreign products from being introduced into the space inside the solenoid 145, a sealing means is provided. The seal means includes an annular seal member 200 between the valve shaft 167 and an annular bearing member 202 connected to a housing 144. A complete seal of the space inside the solenoid causes an additional force to be required for allowing the core 176 to be moved against the force based on the pressure difference between the chamber and the flow passageway. Thus, larger actuator becomes necessary. In order to prevent this, the valve rod 167 is formed therein with a vent passageway 167-2 having a top end opened to the space inside the solenoid and a bottom end opened to the flow passageway 167-2. The provision of such a passageway allows the pressure to be equalized between the space inside the solenoid and the pressure of the engine water passageway in the valve, so that, irrespective of the change in the volume of the space inside the solenoid caused by an ON-OFF movement of the core, the pressure inside the solenoid is maintained substantially unchanged, a smooth movement of the valve assembly at a reduced force by the small diameter solenoid is obtained. The provision of such a vent passageway 167–2 may, however, allow various foreign products in the engine cooling water to be introduced into the space inside the solenoid, causing the sliding parts to stick due to the fact that a foreign substance may be located in the sliding gap between the core and its bearing 178, and between the rod 167 and bearing 182.

The construction of the present invention, which is aimed to overcome this problem in the related non-prior art, will now be explained. In FIG. 2, a reference numeral 10 denotes an engine body that is provided therein with a water jacket (not shown) located on a cooling water recirculating line 12. Arranged on the recirculating line 12 at a location adjacent an inlet 14 of the water jacket in the engine body 10 is a water pump 16 for obtaining recirculation of the engine cooling water in the line 12. Arranged also in the recirculation line 12 is a radiator 18 for emission of the heat of the engine cooling water from the engine 10.

The air conditioning apparatus is provided with a duct 20 that has a first end (upstream end) for introduction of the air from the outside and a second end for discharging the air flow to a cabin of the vehicle. A blower 22 connected to an electric motor 23 is arranged in the first end of the duct for generating a forced flow of air in the duct 20. Arranged in the duct 20 at a location downstream from the fan 22 is an evaporator 24 to which a flow of a refrigerant in a refrigerating cycle (not shown) is introduced, so that the refrigerant is evaporated at the evaporator 24. As a result, heat is absorbed at the evaporator 24 from the air passing the duct 20, thereby cooling the air. Located downstream from the evaporator 24 is a heater core 26, to which the hot water from the engine cooling water line 12 is introduced, so that a heat exchange takes place between the hot water and the air flow in the duct 20, so that the air is subjected to a heating operation. The second (downstream) end of the duct 20 is provided with outlet ducts 20–1, 20–2, and 20–3, opened to respective locations of the cabin. Damper doors 28 and 30 are provided for controlling the flows as discharged from the duct 20 to the cabin.

Heater core 26 has an inner heat exchanging pipe (not shown) having an inlet 26–1 and an outlet 26–2 connected to a hot water line 34 for the heater core 26, which line 34 is branched from the main line 12. Branched from the line 34 is an inlet conduit 36 for taking out water having a high temperature from the engine cooling water line 12 for heating the air, and a return conduit 38 for returning the hot water, after the heat exchange at the heater core 26, to the engine water line 12. Arranged on the hot water line 34 at a location adjacent to the inlet 26–1 of the heater core 26 is a water pump 40 for creating a forced flow of hot water in the heater core 26. A control valve 42 is provided for controlling the flow of hot water in the heater core 26 for obtaining a desired control of the flow of hot water in the heater core 26 for obtaining a desired temperature of the air as discharged from the duct 20.

The control valve 42 is constructed by an upper body 43, a lower body 44, a bottom cover 45, a solenoid actuator 46 and a valve assembly 47. The upper and lower bodies 43 and 44 are connected to each other. The lower body 44 is formed with a water inlet pipe (port A) 54 connected to the inlet conduit 36 for receiving the flow of hot water from the engine water line 12 and a heater outlet pipe (port B) 56 connected to the inlet 26–1 of the heater core 26 for introducing hot water to the heater core 26. The upper body 43 is formed with a heater inlet pipe (port C) 56 connected to the outlet 26–2 of the heater core 26 for receiving the hot water after the heat exchange at the heater core 26 and a water outlet pipe (port D) 62 connected to the conduit 38 for returning the engine cooling water to the engine cooling water recirculation line 12.

The upper body 43 defines therein a first valve seat 64, while the lower body 50 defines a second valve seat 66 that is arranged facing the first valve seat 64 in the direction of the movement of the valve assembly 46. The valve assembly 46 includes a valve rod 67, which integrally forms a first and a second valve members 68 and 70. The valve 70 cooperates with a valve seat 66 for controlling the communication of the port A with a valve chamber E in the body. The valve member 68 cooperating with a valve seat 64 for controlling communication of the valve chamber E with the ports C and D, which are always in communication.

FIG. 3 schematically illustrates how the engine cooling water flows in the system in FIG. 2.

The control valve 42 is operated by the solenoid 46 between a first (OFF) position (FIG. 4(*a*)), where the first valve member 68 seats on the first valve seat 64, and the second valve member 70 is detached from the second valve seat 66, so that the port A is connected to the port B via the chamber E, while communication of the ports C and D with the chamber E is disconnected, and a second (ON) position (FIG. 4(*b*)) where the second valve member 70 seats on the second valve seat 66 and the first valve member 68 is detached from the first valve seat 64.

At the first position, as shown in FIG. 4(*a*), the port A is connected to the port B via the chamber E, while communication of the ports C and D with the chamber E is disconnected. As a result, a flow of water is obtained in the order of the conduit 36, the port A, the port B, the heater core 26, the port C and the port D. Namely, the hot water removed from the engine water recirculation line 12 is introduced into the heater core 26, and the hot water after the heat exchange at the heater core 26 is returned to the engine water recirculating line 12. As a result, the temperature of the air in the duct 20 contacting the heater core 26 is increased.

At the second position, as shown in FIG. 4(*b*), the port A is disconnected to the chamber E, while communication of the ports C and D with the chamber E is obtained. As a result, the introduction of hot water from the engine cooling water line 12 is stopped, and a closed flow of water is obtained in order, the port C, the chamber E, the port B and the heater core 21. As a result, the temperature of the air in the duct 20 contacting the heater core 26 is reduced.

The solenoid 46 includes a casing 72 with a closed top and an opened bottom, a solenoid 74 arranged in the casing 72, a tubular shaped core 76 made of a permanent magnet, a tubular holder 78 for axially and slidably holding the core 76, a connecting rod 80 which is, on one (top) end, connected to the core 76 by a nut 81 and is, on the other (bottom) end, connected to the valve rod 67, a bearing member 82 fixedly connected to the casing 72 to which the connecting rod 80 is axially and slidably supported, and a coil spring 84 arranged between the core 76 and the bearing member 82 for urging the core 76 upwardly so that the valve device takes the first position (FIG. 4(*a*)) where the valve member 68 is seated on the first valve seat 64, and the second valve member 70 is detached from the second valve seat 66. Energization of the solenoid 74 causes an electromagnetic force to be generated between the solenoid 74 and the core 76, causing the core 76 to move downwardly against the force of the spring 84, so that the valve rod 67 is moved downwardly to the second position, where the first valve member 68 is detached from the first valve seat 64 and the second valve member 70 is seated on the second valve seat 66. Such a movement of the core 76 may cause the volume of the space inside the casing 72 to be varied, due to the fact that the core 76 has a tapered bottom end which is inserted or removed from a tapered recess at the top of a bearing member 82. In FIG. 2, a drive circuit 86 is connected to the solenoid 74 of the actuator 46. The control circuit 86 issues a pulse signal P, the duty ratio of which is controlled in accordance with a target air temperature in the cabin. Namely, the duty ratio D is a ratio of duration 1 of an ON signal over a duration of one cycle L. Upon receiving an OFF signal, the introduction of hot water from the engine water recirculation system to the heater core 26 is obtained as shown by FIG. 4(*a*), which causes the temperature of the air as discharged from the duct 20 to increase. Upon receiving an ON signal, the introduction of hot water from the engine water recirculation system to the heater core 26 is stopped and the water is only recirculated as shown by FIG. 4(*b*), which causes the temperature of the air as discharged from the duct 20 to decrease. Thus, the higher the value of the duty ratio D, the lower the temperature of the air as discharged to the cabin. Thus, the value of the duty ratio D is controlled so as to obtain a target air temperature.

Now, a construction for obtaining a seal of the engine water in the valve device, while movement of the valve assembly in not restrained irrespective of the existence of a change in the volume of the space inside the solenoid 46 during operation. Namely, the connecting rod 80 has a bottom end 80–1 connected to a top end 67–1 of the valve rod 67. A first flexible seal member 88 made of a certain type of rubber is provided, which has, as shown in FIG. 5, an inner tubular portion 88–1 connected to a top end 67–1 of the rod 67 by means of a fixing member 90, and an annular plate shaped outer periphery portion having an increased thickness that is arranged in an annular recess at a shoulder portion of the top housing 43, which is connected by a retainer plate 94 to the housing 43. A second flexible seal member 96 made of a certain type of rubber is provided, which has a tubular central portion 96–1 fixed to a bottom attachment member 98, which is fixed to the bottom end of the valve rod 67, and is connected to the outer surface of the valve rod by means of a fixing member 100, and a outer peripheral portion 96–2 having an annular plate shape with an increased thickness, which is arranged in an annular groove formed at the bottom end surface of the lower casing 44, and is fixedly arranged in the groove due to the fact that the cover 45 is fixedly connected to the bottom housing 44. Finally, the connecting rod 80 has an axial bore 80–2 therethrough; the valve rod 67 has an axial bore 67–2 therethrough, and the adapter member 98 has an axial bore 98–1 therethrough. These bores 80–2, 67–2 and 98–1 are in communication so as to provide a communication passageway which is, at its top end, opened to a space 104 formed inside the actuator 46, and is, at its bottom end, opened to a chamber 106 formed between the second flexible seal member 96. Namely, the chamber 104 in the solenoid mechanism 46 and the chamber 106 below the diaphragm 96 are under mutual communication. As a result, the space inside the casing 72 for storing the parts of the electromagnetic actuator is sealed from the flow passageway in the valve, while the diaphragms 88 and 96 allow the valve assembly to move without being restrained when the electromagnetic force is controlled due to the fact that the top chamber 104 and the bottom chamber 106 are in communication with each other for equalizing the pressure between the chambers 104 and 106.

A movement of the valve core 76 and the connecting rod 80 connected thereto between the OFF condition and ON condition causes a charge in the volume of the space 104 inside the solenoid mechanism. However, upon such a change in the volume in the space 104 of the solenoid mechanism, the pressure at the chamber 104 is instantly equalized to the pressure at the second chamber 106, due to the fact that the first and second chambers 104 and 106 are in communication via the communication passageway formed by the openings 80–2, 67–2 and 98–1. Namely, the same amount of change in the volume of the second chamber 106 can instantly be obtained. As a result, a desired movement of the valve rod 67 is obtained upon switching between the ON and OFF conditions, while maintaining a relatively small solenoid mechanism.

Furthermore, the provision of the first and second seal members 88 and 96 prevent foreign substances in the engine cooling water from being introduced into the space inside the solenoid mechanism. As a result, a stick-less slide movement of the moving parts (core 76 and the connecting rod 80) with respect to stational parts (bearing members 78 and 82) is obtained for a longer service life.

It should be noted that an anti-corrosion agent is included in the air in the chambers 104 and 106, and the passageway in the rods 67, 80 and 98.

The seal members 88 and 96 are made from a rubber material, such as EPDM based (ethylene propylene rubber), which is reliable when used in engine cooling water with high temperatures and anti-freezing agents.

As a modification, in place of a provision of the connection passageway in the rods 67, 80 and 98, a passageway between the chambers 104 and 106 may be provided in the housing or a tube separate from the housing can be provided for obtaining communication between the chambers 104 and 106.

Furthermore, in place of forming the second chamber 106 opposite the first chamber 104 along the axis of the valve rod, a second chamber is independently provided, which includes a member that moves in relationship with the valve rod, so that the pressure is equalized between the first and second chamber upon the movement of the valve rod.

We claim:

1. An electro-magnetic valve device for controlling a flow of a fluid, comprising:

a housing defining therein a passageway for the fluid;

a valve rod having at least one valve member, said valve rod being movably arranged in the housing for controlling the flow of the fluid in said passageway, said valve rod defining first and second axially opposite end surfaces extending transversely to an axis of the rod;

a solenoid mechanism that includes a solenoid for obtaining a reciprocating movement of said valve rod for a desired stroke, and a first chamber for storing the solenoid, a volume of the first chamber being varied in accordance with the movement of said valve rod;

a first seal member made of a flexible material arranged between the valve rod and the housing so that said first chamber is sealed with respect to the passageway;

means for defining a second chamber at the end of said valve rod, said rod being slidably supported solely at a location in the solenoid mechanism and being non-slidably supported at a location adjacent the second chamber; and said valve rod having an axially extending through hole having a first end opened to the first chamber at the first end surface of the rod and a second end opened to the second chamber at the second end surface of the rod for obtaining fluid communication between the first and second chambers for equalizing the pressure between the first and second chambers, so that the volume of said second chamber is increased upon a stroke movement of the valve rod for decreasing the volume of the first chamber, and is decreased upon a stroke movement of the valve rod for increasing the volume of the first chamber, the rod being supported with respect to the housing at a location opposite to the solenoid mechanism so that no additional force due to a pressure difference is generated in the rod opposing sliding movement of the rod.

2. An electro-magnetic valve device according to claim 1, further comprising a means for sealingly connecting the solenoid mechanism to the housing.

3. An electro-magnetic valve device according to claim 1, wherein said seal member is made of a rubber material having a tubular shaped central portion connected to the valve rod and an outer portion of an annular plate shape connected to the housing.

4. An electro-magnetic valve device according to claim 1, wherein said second chamber defining means comprising an additional seal member made of a flexible material connected to the valve rod at a position spaced from the position where the first seal member is connected to the rod, and a cover member for covering an end of said valve rod and connected to the housing together with said additional seal member so that said second chamber is formed on one side of the additional seal member inside the cover member, which has a sealed relationship with respect to the flow passageway.

5. An electro-magnetic valve device according to claim 4, wherein said additional seal member is made of a rubber material having a tubular shaped central portion connected to the valve rod and an outer portion of an annular plate shape connected to the housing.

6. An electro-magnetic valve device for controlling a flow of a fluid, comprising:

a housing defining therein a passageway for the fluid;

a valve rod having at least one valve member movably arranged in the housing for controlling the flow of the fluid in said passageway, said valve rod defining axially opposite first and second end surfaces extending transversely to the axis of the rod;

a solenoid mechanism that includes a solenoid for obtaining a reciprocating movement of said valve rod for a desired stroke, and a first chamber for storing the solenoid, a volume of the first chamber being varied in accordance with the movement of said valve rod;

a first seal member made of a flexible material arranged between the valve rod and the housing so that said first chamber is sealed with respect to the passageway;

a second seal member made of a flexible material connected to the valve rod at a position spaced from the position where the first seal member is connected to the rod; and

7. An electro-magnetic valve device for controlling a flow of a fluid, comprising:

a housing defining therein a passageway for the fluid and defining an inner tapered valve seat portion in said passageway;

a valve rod movably disposed in said passageway and having at least one valve member which is seated on said valve seat portion when the flow of the fluid in said passageway is to be closed off;

a solenoid mechanism that includes a solenoid for obtaining a reciprocating movement of said valve rod for a desired stroke, and a first chamber for storing the solenoid, a volume of the first chamber being varied in accordance with the movement of said valve rod;

a first seal member made of a flexible material arranged between the valve rod and the housing so that said first chamber is sealed with respect to the passageway;

a second seal member made of a flexible material connected to the valve rod at a position spaced from the position where the first seal member is connected to the rod; and a cover member for covering an end of said valve rod and connected to the housing together with said second seal member so that said second chamber is formed outside of the second sealing member at the end of said valve rod, the cover member having a sealed relationship with respect to the flow passageway, wherein said rod is slidably supported solely at a location in the solenoid mechanism so that any sliding contact between the valve rod and the cover member is prevented, thereby preventing any additional force from due to the pressure difference being generated in the rod opposing sliding movement of the rod.

* * * * *